Dec. 4, 1951   P. J. IMSE   2,577,193
TOOL FOR FACILITATING THE REMOVAL OF SPRING CLIPS
FROM SPROCKET CHAINS AND THE LIKE
Filed Feb. 10, 1950
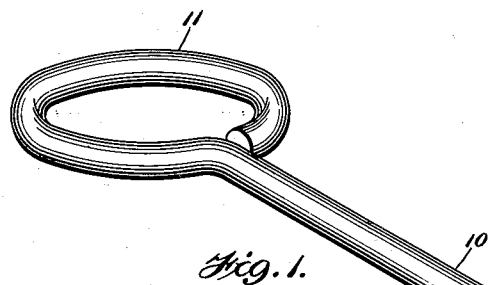
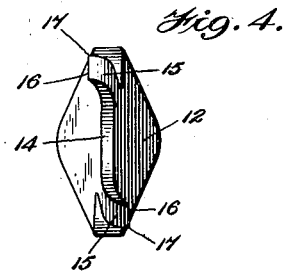
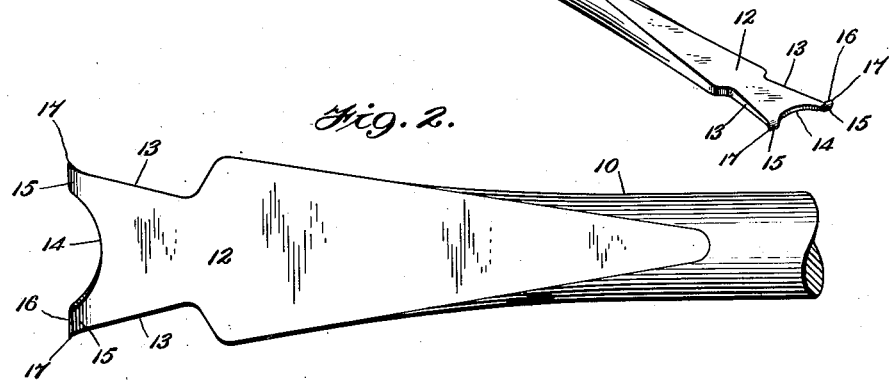
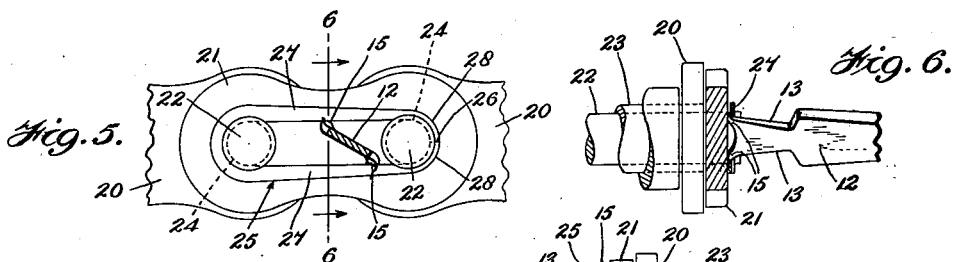
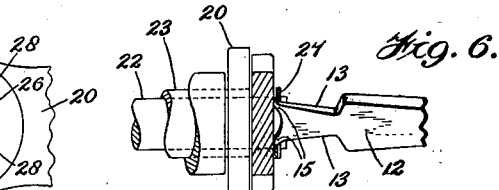
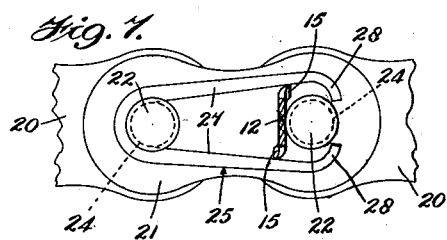
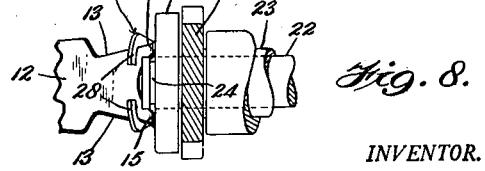
INVENTOR.
Philip J. Imse,
BY
ATTORNEY Patented Dec. 4, 1951

2,577,193

UNITED STATES PATENT OFFICE 2,577,193

TOOL FOR FACILITATING THE REMOVAL OF SPRING CLIPS FROM SPROCKET CHAINS AND THE LIKE

Philip J. Imse, Westfield, Mass., assignor to Chain Belt Company, Milwaukee, Wis., a corporation of Wisconsin Application February 10, 1950, Serial No. 143,532

3 Claims. (Cl. 59—7)

The invention has for its principal object the provision of a simple, inexpensive and efficient implement for facilitating the disengagement and removal of a loop type of resilient retaining member such as is frequently employed in conjunction with certain forms of sprocket chains to maintain some or all of the links thereof in assembled relation.

These chains comprise alternate "roller links" and "pin links," the former of which are assembled units composed of a pair of side bars rigidly held in laterally spaced relation by a pair of longitudinally spaced transversely extending sleeves or bushings, the ends of which are press-fitted or otherwise rigidly secured in apertures in the end portions of the side bars. Usually anti-friction rolls are journalled upon the bushings for engagement with the sprocket teeth, although in some instances these rolls are omitted. The "pin links" comprise a pair of side bars, one of which has a pair of longitudinally spaced chain pins rigidly secured to and extending laterally from the end portions thereof, for insertion into the bushings of the adjacent roller links, whereby to provide the articulating joints of the chain. After such insertion the second side bar of the pin link is positioned upon the projecting ends of the pins and retained in position thereon in various ways.

In some instances this retention is accomplished by a cotter passed through a transverse hole in the projecting end of each chain pin just outside the detachable side bar. In other cases the projecting end of each chain pin is provided with a circumferential groove just outside the detachable side bar and a resilient retaining member of the split elongated-loop type shown in U. S. Patent No. 617,716 to Homer M. Caldwell —and commonly referred to as a "spring clip"— is positioned about the pins of each pin link and seated in the said grooves thereof. Sometimes only one or a few of the pin links are provided with these "spring clips," the ends of the pins of the remaining links being peened or riveted over at assembly to provide permanent attachment of the affected pin and roller links.

As above indicated, the present invention is concerned with the removal of spring clips of the type just mentioned. Heretofore such removal has commonly been effected by introducing the end of a screw driver blade or similar flat implement between the spaced longitudinal members of the clip, at right angles to the face of the side bar and adjacent the pin encircled by the split end of the clip, and by turning the blade about its axis to bring the lateral edges thereof into engagement with the longitudinal members of the clip, to spread the split end portion of the clip until it is disengaged from the pin groove; then, while holding the clip so spread, to work such end portion outwardly from the side bar to a position beyond the end of the pin. This latter operation may be accomplished by means of the fingers, or with the aid of a knife blade or like thin instrument forced in between the clip and the face of the side bar, and used as a pry.

However, since the clips are relatively thin— in the smaller sizes only a few hundredths of an inch in thickness—much difficulty is experienced in keeping the screw driver blade or similar spreading implement in operative position and frequently it will slip out of place before the desired spreading action and removal can be accomplished. Even after the clip is spread it is awkward and difficult to maintain it in such condition while working it outwardly beyond the pin end.

The present invention provides a tool which not only tends to maintain itself in operative position during the spreading action, but also automatically moves the split end portion of the clip outwardly from the side bar and beyond the end of the chain pin as the spreading is completed.

One form of the tool is illustrated in the accompanying drawing forming a part of this specification, in which like reference characters designate like parts in all the views, and in which:

Figure 1 is a perspective view of the tool;

Fig. 2 is an enlarged plan view of the blade portion thereof;

Fig. 3 is an enlarged side elevational view;

Fig. 4 is an end view, as seen from the left of Fig. 2;

Fig. 5 is a side elevational view of a chain "pin link" equipped with a spring clip of the type indicated, and showing an initial position of the tool blade preparatory to spreading and removing such clip;

Figure 6 is a cross sectional view, on the plane indicated by the line 6—6 in Fig. 5, looking in the direction of the arrows;

Fig. 7 is a view similar to Fig. 5, showing the positions of the parts as the spreading is completed; and Fig. 8 is an end view as seen from the right of Fig. 7, illustrating the complete disengagement of the split end of the clip from the chain pin.

Referring to the drawing in greater detail, as here shown the tool is formed from a length of steel rod of circular cross section providing a shank 10 having a loop 11 at one end constituting a grip or handle by means of which the device may be manipulated. The other end of the shank is flattened to provide a blade 12, the end portion of which is of a width substantially greater than the distance between the spaced longitudinal members of the spring clips upon which the tool is to be used, and which portion is formed with sides 13 which converge rearwardly from the blade end. Such end is arcuately or otherwise cut away at 14 to provide a pair of transversely spaced prongs or horns 15 which taper to sharp edges 16 and are bent or curved in opposite directions, as shown in Figs. 1, 3 and 4. The outer tips 17 of these horns lie laterally outward of the planes of the convergent side faces 13 of the blade, as clearly indicated in Fig. 2, thereby facilitating entry of the horns between the contacting faces of the clip members 27 and the chain side bar 21, as shown in Fig. 6.

The manner of using the tool is illustrated in Figs. 5–8 inclusive. In these figures 20 designates the side bars of a pair of adjacent "roller links," and 21 the removable side bar of a "pin link" connecting the said roller links. The pin apertures of said removable pin link side bar slidably fit upon the end portions of the pair of chain pins 22 which are rigidly carried by the other side bar of the pin link (not shown), which pins pass through and are journalled in the bushings 23 of the adjacent roller links. The said end portions of the chain pins are circumferentially grooved as at 24 for the reception of the semi-circular end portions of a resilient elongated-loop type retaining member or "spring clip" 25, one of which semi-circular portions is severed at 26 so that the clip may be spread as indicated in Fig. 7.

The blade 12, which as above mentioned is wider than the normal distance between the longitudinal members 27 of the clip 25, is introduced between such members in an inclined position, as shown in Fig. 5, with the horns 15 pressed against the outer face of the side bar 21, whereupon by turning the blade in a clockwise direction the sharp corners or tips 17 of the horns will be wedged in between the inner faces of the clip members 27 and the outer face of the said side bar. This engagement of the horn tips behind the clip not only prevents the blade from slipping out of position but also slightly bows the clip members 27 outwardly away from the side bar and places the hook portions 28 of the severed end of the clip under tension which tends to move such portions away from the side bar. Such action of course will be prevented so long as the hook portions are seated in the groove 24 of the chain pin, but as turning of the blade continues the members 27 of the clip will be spread apart and the hooks withdrawn from the said groove. As the blade 12 reaches substantially the position shown in Fig. 7 the hook portions 28 of the clip will clear the flange defining the outward side of the groove 24, whereupon the above described tension provided by the wedging action of the horns 15 during turning of the blade will move the split end portion of the clip outwardly past the end of the chain pin 22, as indicated in Fig. 8, with the opposed edge faces of the longitudinal clip members 27 riding down the inclined side faces 13 of the tool blade. The resilience of the clip tending to restore it to the Fig. 5 position causes the said clip members 27 to firmly grip the blade faces 13, and coupled with the divergence of the latter prevents the clip from springing back against the side bar 21. If now the tool be bodily moved toward the left, as viewed in Fig. 7, the divergent longitudinal members 27 of the clip may be easily disengaged from the left hand chain pin 22 and the clip thus completely removed from the chain.

It is not absolutely essential that the tool be turned to the vertical position shown in Fig. 7, whereby to simultaneously disengage both hooks 28 of the spring clip from the pin groove 24, and in the case of highly tempered clips where excessive spreading of the longitudinal members 27 might cause fracture of the clip, the following procedure may be employed.

With the blade 12 initially positioned between the clip members 27 as shown in Fig. 5, if an upward pressure be exerted upon the tool during turning of the blade toward the Fig. 7 position, the effect will be to lift the upper clip member 27 as the spreading is effected, and disengage its hook 28 from the pin groove 24 while leaving the lower clip member in the Fig. 5 position, with its hook seated in said groove. When the upper hook 28 has been thus cleared from the groove, it will move outwardly from the side bar 21 to beyond the end of the pin 22, riding on the upper inclined surface 13 of the blade, as above described. The upward pressure on the tool is now reversed to a downward pressure, which will disengage the lower hook 28 from the pin groove and cause it to move outwardly along the lower inclined surface of the blade, whereupon leftward bodily movement of the tool will disengage the clip 25 from the other chain pin, as before. Obviously, this mode of use occasions less spreading of the clip members 27 than the first described method; and it may be accomplished with less angular movement of the blade from the Fig. 5 position.

The blade 12 preferably is hardened or tempered to prevent distortion of the horns 15 and to enhance the wearing properties; and while the implement is here shown and described as being formed from round bar stock, obviously it might be stamped from flat plate or other stock if desired.

What is claimed is:

1. A tool for facilitating the removal of spring clips of the split elongated-loop type from the pins of sprocket chains and the like, said tool comprising a flat blade of a width greater than the distance between the spaced longitudinal members of the clips, said blade terminating in a pair of transversely spaced horns adapted to be introduced between and engage said spaced longitudinal clip members, and upon partial rotation of the blade about its longitudinal axis to spread said members farther apart, said blade also having rearwardly convergent side faces extending from the horns for receiving and holding said clip members spaced from the side of the chain upon disengagement of such members from a chain pin.

2. A tool for facilitating the removal of spring clips of the split elongated-loop type from the pins of sprocket chains and the like, which pins have recesses normally seating portions of said clips, said tool comprising a flat blade of a width greater than the distance between the spaced longitudinal members of the clips, said blade terminating in a pair of transversely spaced horns which are bent out of the planes of the flat faces of the blade, one in one direction and the other in the opposite direction and the outer tips of said horns lying laterally outward of the planes of the side faces of the blade, whereby upon introduction between said spaced longitudinal members of the clips and partial rotation of the blade said horns will engage behind said clip members to prevent unintentional displacement of the tool, and concomitantly spread said clip members farther apart to disengage them from said pin recesses.

3. A tool for facilitating the removal of spring clips of the split elongated-loop type from circumferentially grooved pins of sprocket chains, said tool comprising a flat blade of a width greater than the normal distance between the spaced longitudinal members of the clips, said blade terminating in a pair of transversely spaced horns of tapering thickness which are curved out of the planes of the flat faces of the blade, one in one direction and the other in the opposite direction, whereby upon introduction between said spaced longitudinal clip members and partial rotation of the blade about its longitudinal axis said tapering horns will wedge between said clip members and the adjacent chain side bar to prevent unintentional displacement of the tool, and concomitantly spread said longitudinal clip members farther apart to disengage them from said pin grooves, said blade also having side faces converging away from said horns for engagement by and retention of said clip members in spaced relation to the side of the chain upon disengagement of the members from the pin.

PHILIP J. IMSE.

REFERENCES CITED

The following references are of record in the file of this patent:

UNITED STATES PATENTS

| Number | Name | Date |
|---|---|---|
| 685,197 | Barnes | Oct. 22, 1901 |